US011735923B2

(12) United States Patent
Ghassempour Aghamolki et al.

(10) Patent No.: US 11,735,923 B2
(45) Date of Patent: Aug. 22, 2023

(54) VOLTAGE REGULATION DEVICE THAT INCLUDES A CONVERTER FOR HARMONIC CURRENT COMPENSATION AND REACTIVE POWER MANAGEMENT

(71) Applicant: Eaton Intelligent Power Limited, Dublin (IE)

(72) Inventors: Hossein Ghassempour Aghamolki, Edina, MN (US); Wei Ren, Plymouth, MN (US); Swaroop Gajare, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 110 days.

(21) Appl. No.: 17/376,994

(22) Filed: Jul. 15, 2021

(65) Prior Publication Data
US 2022/0037887 A1    Feb. 3, 2022

Related U.S. Application Data

(60) Provisional application No. 63/057,452, filed on Jul. 28, 2020.

(51) Int. Cl.
*H02J 3/18*    (2006.01)
*H02J 3/01*    (2006.01)
(Continued)

(52) U.S. Cl.
CPC .............. *H02J 3/1878* (2013.01); *H02J 3/01* (2013.01); *H02M 1/12* (2013.01); *H02M 1/4208* (2013.01)

(58) Field of Classification Search
CPC .......... H02J 3/1878; H02J 3/01; H02J 3/1835; H02J 3/1842; H02J 3/1864; H02J 3/1821; H02M 1/4208; H02M 1/12
See application file for complete search history.

(56) References Cited

U.S. PATENT DOCUMENTS 4,090,225 A     5/1978  Gilker et al.
5,166,597 A  *  11/1992 Larsen ...................... G05F 1/20
                                                      323/215
(Continued)

FOREIGN PATENT DOCUMENTS

CN     2527014 Y    12/2002
CN     2593463 Y    12/2003
(Continued)

OTHER PUBLICATIONS

M. De Iulis, European International Searching Authority, International Search Report and Written Opinion, counterpart PCT Application No. PCT/EP2021/025271, dated Nov. 4, 2021, 12 pages total.
(Continued)

*Primary Examiner* — Harry R Behm
(74) *Attorney, Agent, or Firm* — DiBerardino McGovern IP Group LLC

(57) ABSTRACT

A voltage regulation device includes: an input node configured to receive electrical power from an electrical power source; a primary winding electrically connected to the input node; an output node configured to provide electrical power to a load; a shunt winding electrically connected to the output node; a converter configured to provide a compensation current to the shunt winding; and a control system configured to: determine a harmonic compensation signal based on harmonic frequency data; determine a reactive power compensation signal based on a reactive power set point; and control the converter based on the determined harmonic compensation signal and the determined reactive power compensation signal to produce the output compensation signal. The output compensation signal is configured to reduce the one or more harmonic frequency components in a current that flows in the output node and to control an amount of reactive power at the output node.

23 Claims, 13 Drawing Sheets

(51) Int. Cl.
*H02M 1/12* (2006.01)
*H02M 1/42* (2007.01)

(56) References Cited

U.S. PATENT DOCUMENTS

| | | |
|---|---|---|
| 5,604,424 A | 2/1997 | Shuttleworth |
| 5,621,305 A | 4/1997 | Clark et al. |
| 5,682,306 A | 10/1997 | Jansen |
| 5,999,430 A | 12/1999 | Aritsuka |
| 6,020,726 A | 2/2000 | James |
| 6,144,191 A | 11/2000 | Raedy |
| 6,218,744 B1 * | 4/2001 | Zahrte, Sr. ............ H02M 7/797 307/64 |
| 6,294,900 B1 | 9/2001 | Greenwood et al. |
| 6,459,606 B1 | 10/2002 | Jadric |
| 6,472,851 B2 | 10/2002 | Hammond |
| 6,965,291 B2 | 11/2005 | Haugs et al. |
| 7,064,966 B2 | 6/2006 | Yamada et al. |
| 7,355,369 B2 | 4/2008 | Lavieville et al. |
| 7,656,138 B2 | 2/2010 | Dohnal |
| 7,855,906 B2 | 12/2010 | Klodowski et al. |
| 8,013,555 B2 | 9/2011 | Thornell-Pers |
| 8,207,716 B2 | 6/2012 | Raedy et al. |
| 8,379,416 B1 | 2/2013 | Datta et al. |
| 8,384,333 B2 | 2/2013 | Shimada |
| 9,087,635 B2 | 7/2015 | Rosado et al. |
| 9,263,961 B2 | 2/2016 | Jacobson et al. |
| 9,304,522 B2 | 4/2016 | Divan et al. |
| 9,450,410 B2 | 9/2016 | Moore et al. |
| 9,557,754 B2 | 1/2017 | Panosyan et al. |
| 9,570,252 B2 | 2/2017 | Wijekoon et al. |
| 9,800,161 B2 | 10/2017 | Crane et al. |
| 9,819,188 B1 | 11/2017 | Pan et al. |
| 10,014,791 B2 | 7/2018 | Bala |
| 10,224,718 B2 | 3/2019 | Sun |
| 2009/0230933 A1 | 9/2009 | Oates et al. |
| 2010/0201338 A1 | 8/2010 | Haj-Maharsi et al. |
| 2011/0057517 A1 * | 3/2011 | Zhang ..................... H02J 3/01 307/105 |
| 2011/0304141 A1 * | 12/2011 | Van Dyck ............ H02J 3/1878 290/44 |
| 2013/0308361 A1 | 11/2013 | Steigerwald et al. |
| 2014/0009980 A1 * | 1/2014 | Divan ................. H02M 5/458 363/37 |
| 2016/0359326 A1 | 12/2016 | Sun |
| 2017/0154738 A1 | 6/2017 | Baeuml et al. |
| 2017/0250540 A1 * | 8/2017 | Varma ...................... H02J 3/46 |
| 2017/0344039 A1 | 11/2017 | Stich et al. |
| 2018/0024583 A1 | 1/2018 | Haensgen et al. |
| 2018/0173257 A1 | 6/2018 | Dauzat |
| 2020/0057461 A1 | 2/2020 | Schaar |

FOREIGN PATENT DOCUMENTS

| | | | |
|---|---|---|---|
| CN | 1641809 A | 7/2005 | |
| CN | 2896468 Y | 5/2007 | |
| CN | 200956303 Y | 10/2007 | |
| CN | 201035439 Y | 3/2008 | |
| CN | 101325124 A | 12/2008 | |
| CN | 201466724 U | 5/2010 | |
| CN | 101728830 A | 6/2010 | |
| CN | 101860229 A | 10/2010 | |
| CN | 101938130 A | 1/2011 | |
| CN | 102035212 A | 4/2011 | |
| CN | 201821315 U | 5/2011 | |
| CN | 201846299 U | 5/2011 | |
| CN | 202373982 U | 8/2012 | |
| CN | 103019284 A | 4/2013 | |
| CN | 203278226 U | 11/2013 | |
| CN | 103762598 A | 4/2014 | |
| CN | 203632254 U | 6/2014 | |
| CN | 104007780 A | 8/2014 | |
| CN | 104009485 A | 8/2014 | |
| CN | 203858969 U | 10/2014 | |
| CN | 203967987 U | 11/2014 | |
| CN | 204068719 U | 12/2014 | |
| CN | 104362644 A | 2/2015 | |
| CN | 204190625 U | 3/2015 | |
| CN | 204205599 U | 3/2015 | |
| CN | 105119262 A | 12/2015 | |
| CN | 204857421 U | 12/2015 | |
| CN | 105529911 A | 4/2016 | |
| CN | 108037346 A | 5/2018 | |
| DE | 742091 C | 5/1953 | |
| ES | 1112180 U * | 6/2014 | ............ G05F 1/14 |
| GB | 2424766 A | 10/2006 | |
| JP | H11164559 A | 6/1999 | |
| JP | 2001169539 A | 6/2001 | |
| JP | 2002091578 A | 3/2002 | |
| JP | 4872090 B2 | 9/2014 | |
| JP | 6259202 B2 | 9/2014 | |
| JP | 2014176270 A | 9/2014 | |
| RU | 2308779 C2 | 10/2007 | |
| RU | 2564990 C2 | 10/2015 | |
| WO | 2015025133 A1 | 2/2015 | |
| WO | 2017205616 A1 | 11/2017 | |

OTHER PUBLICATIONS

VR-32 Voltage Regulator with Quik-Drive™ Tap-Changer, Installation, Operation, and Maintenance Instructions, MN225008EN, p. 15, Eaton Corporation, Feb. 2017.

Product description, VACUTAP® RMV-II, 2159612/02 EN, pp. 16-18, Maschinenfabrik Reinhausen GmbH, 2004.

Connection Diagrams, JFR Distribution Step Voltage Regulator Installation—Operation—Maintenance Instructions, 21-115532-001 PR4018-6, pp. 6-7, Siemens Energy, Inc., Oct. 2008.

* cited by examiner

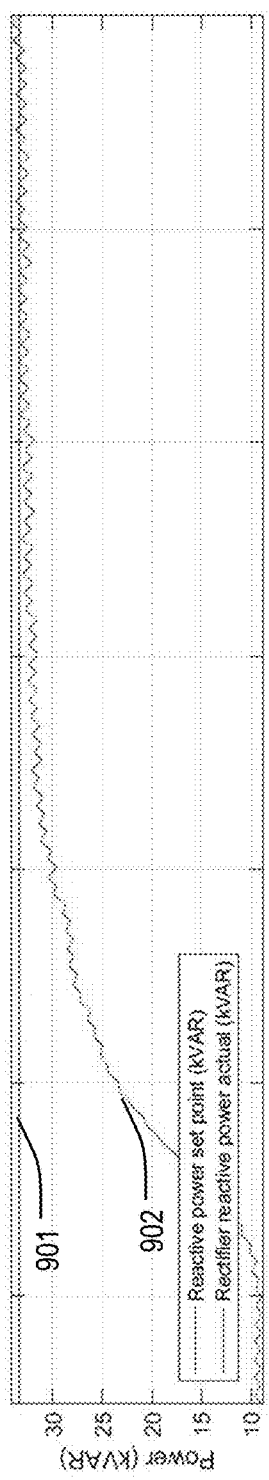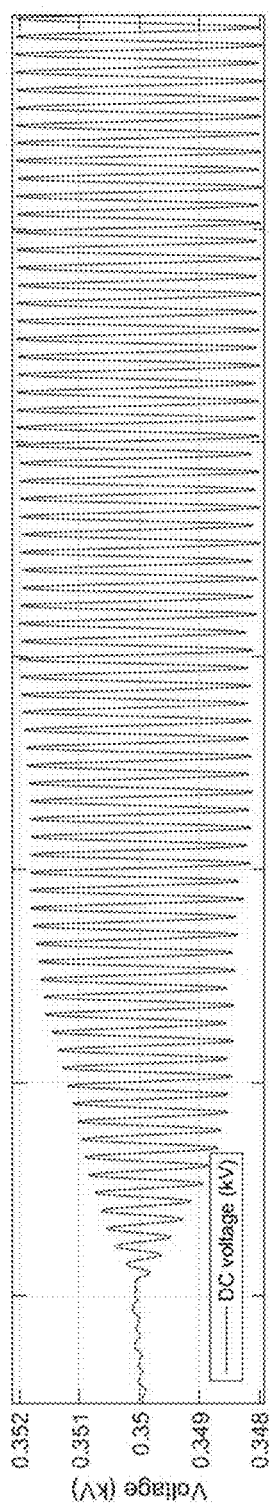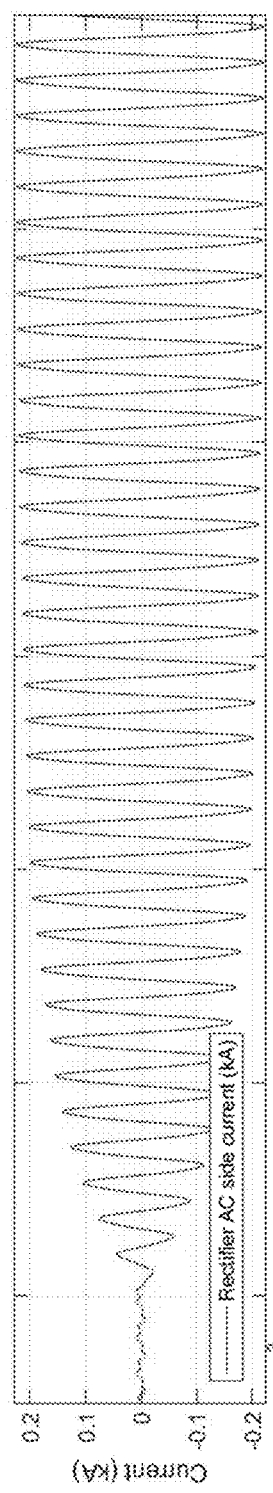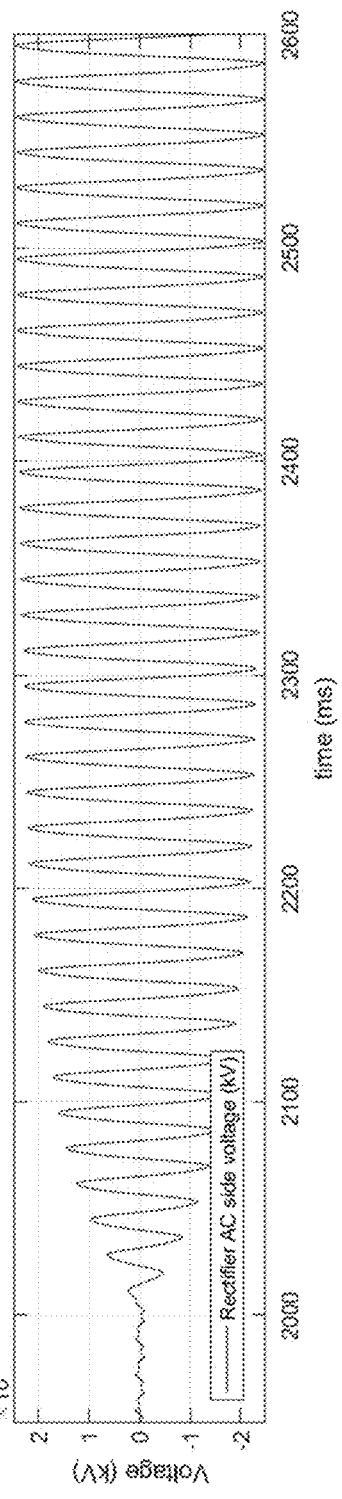
FIG. 9A
FIG. 9B
FIG. 9C
FIG. 9D

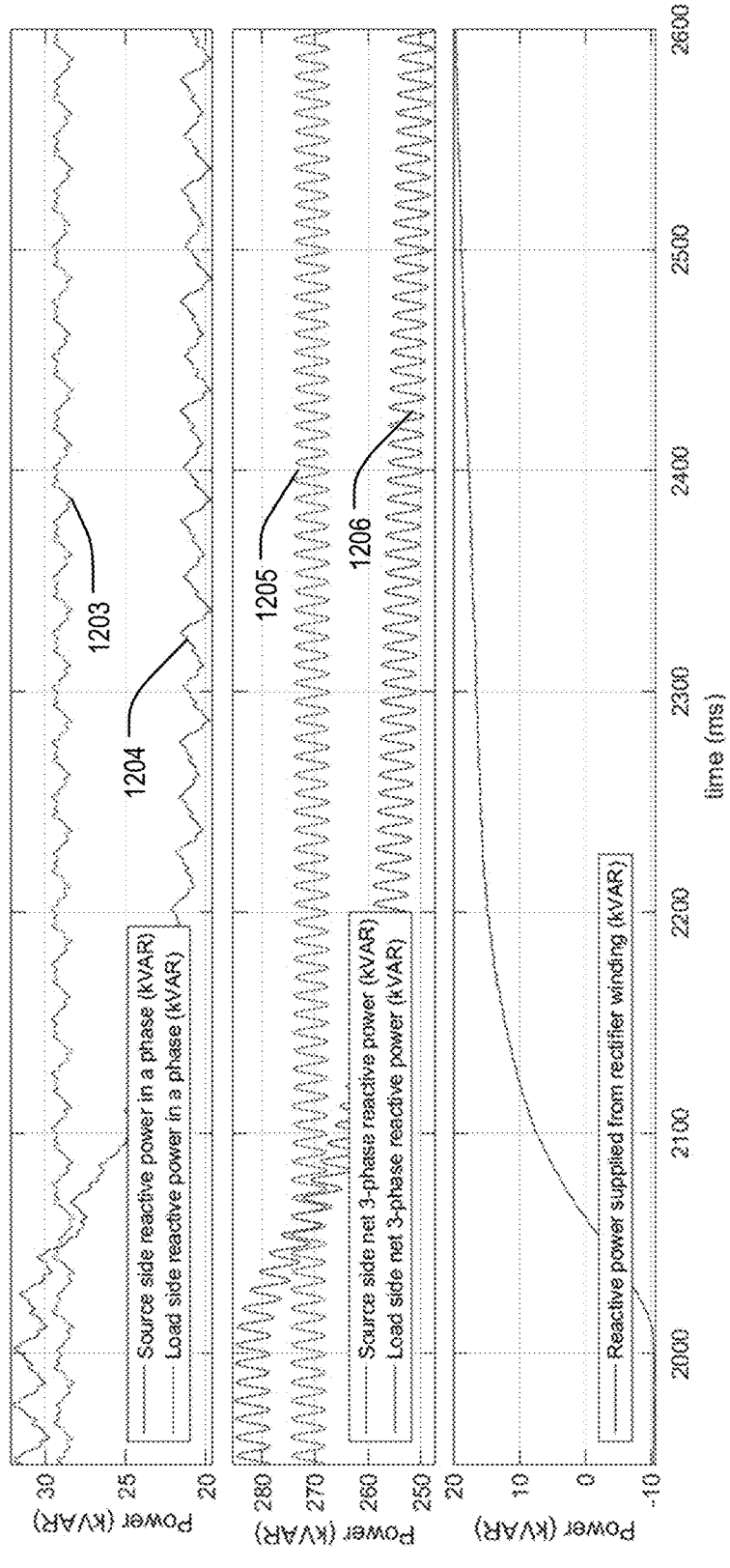

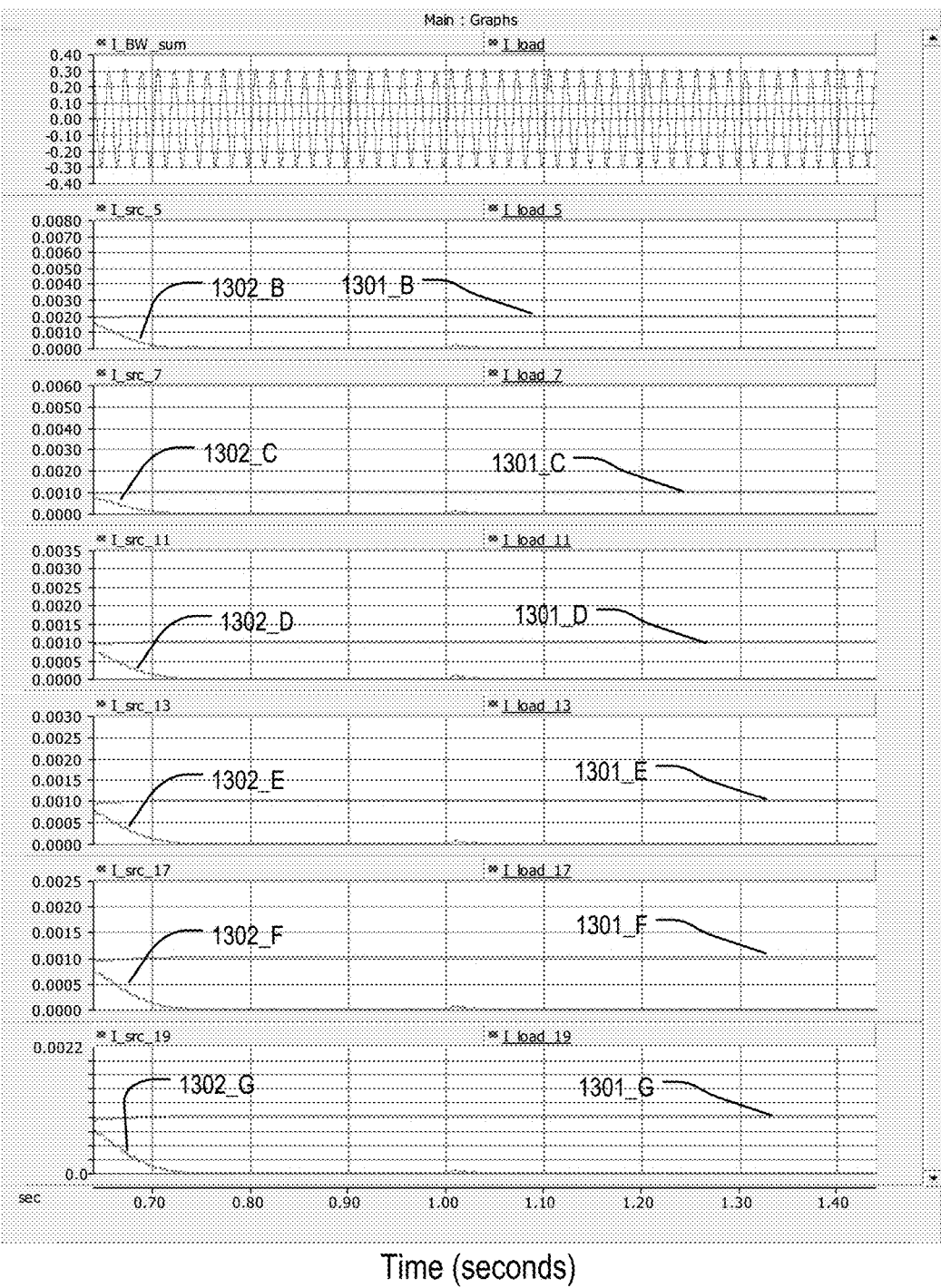

VOLTAGE REGULATION DEVICE THAT INCLUDES A CONVERTER FOR HARMONIC CURRENT COMPENSATION AND REACTIVE POWER MANAGEMENT

CROSS-REFERENCE TO RELATED APPLICATION

This application claims the benefit of U.S. Provisional Application No. 63/057,452, filed on Jul. 28, 2020 and titled VOLTAGE REGULATION DEVICE THAT INCLUDES A CONVERTER FOR HARMONIC CURRENT COMPENSATION AND REACTIVE POWER MANAGEMENT, which is incorporated herein by reference in its entirety.

TECHNICAL FIELD

This disclosure relates to a voltage regulation device that includes a converter that provides harmonic current compensation and reactive power management.

BACKGROUND

Voltage regulators are used to monitor and control a voltage level in an electrical power distribution network. A voltage regulator includes a main winding and an electromagnetic circuit that delivers current from the main winding to an electric load. The electromagnetic circuit includes electrical contacts, and the main winding includes a plurality of taps. The output voltage of the voltage regulator is determined by which of the plurality of taps are in contact with the electrical contacts.

SUMMARY

In one aspect, a voltage regulation device configured to maintain a voltage in an alternating current (AC) electrical power distribution network to within a range of voltages includes: an input node configured to receive electrical power from an electrical power source; a primary winding electrically connected to the input node; an output node configured to provide electrical power to a load; a shunt winding electrically connected to the output node; a converter configured to provide a compensation current to the shunt winding; and a control system configured to: determine a harmonic compensation signal based on harmonic frequency data, the harmonic frequency data including one or more harmonic components; determine a reactive power compensation signal based on a reactive power set point; and control the converter based on the determined harmonic compensation signal and the determined reactive power compensation signal to produce the output compensation signal. The output compensation signal is configured to reduce the one or more harmonic frequency components in a current that flows in the output node and to control an amount of reactive power at the output node.

Implementations may include one or more of the following features. Each harmonic component may be a sine wave at a harmonic frequency of a fundamental frequency of the AC electrical power distribution network.

The reactive power set point may be an amount of reactive power to be provided by the converter to the shunt winding.

The control system may be configured to receive the reactive power set point from an operator.

The compensation signal may be configured to control the amount of reactive power at the output node by injecting reactive power at the shunt winding or removing reactive power at the shunt winding such that the reactive power at the output node remains within a range of values without changing an amount of reactive power from the electrical power source.

The converter may include an auxiliary winding, and, in these implementations, the converter is configured to magnetically couple to the shunt winding with the auxiliary winding. The voltage regulation device also may include a magnetic core, and the primary winding, the shunt winding, and the auxiliary winding may be wound about the magnetic core. The primary coil may include one or more electrically conductive taps, and the voltage regulation device also may include: an inverter electrically connected to the converter; and one or more moveable electrical contacts, each of the one or more moveable electrical contacts configured to connect to and disconnect from any one of the electrically conductive taps. The converter also may include a second auxiliary coil electrically connected to the inverter, and the second auxiliary coil is configured to magnetically couple to the moveable electrical contacts. The control system may be configured to control the inverter to thereby control an amount of current in one or more of the movable electrical contacts during a switching operation. The converter also may include an energy source electrically connected to the inverter.

The converter may be configured to apply pulse-width modulation to the harmonic compensation signal and the reactive power compensation signal to produce the output compensation signal.

The converter may include a rectifier.

In another aspect, a control system for a voltage regulation device includes one or more electronic processors; and an electronic storage coupled to the one or more electronic processors, the electronic storage including machine-executable instructions that, when executed, cause the one or more electronic processors to: determine a harmonic compensation signal based on frequency data, the frequency data including one or more harmonic components; determine a reactive power compensation signal based on a reactive power set point; and control a converter in the voltage regulator based on the determined frequency compensation signal and the determined reactive power compensation signal to produce an output compensation current. The output compensation current is configured to control an amount of reactive power provided by the converter and to reduce an effect of harmonic components in electrical power received at an input node of the voltage regulation device.

Implementations may include one or more of the following features. The amount of reactive power may be controlled to be equal to the reactive power set point. The output compensation current may include one or more components, each of which are 180° out-of-phase with the one or more harmonic components.

In another aspect, a voltage regulator that includes a converter is controlled: a reactive power set point is determined, the reactive power set point being a target amount of reactive power provided by an electrical source electrically connected to the voltage regulator at an input node; harmonic frequency data at a load electrically connected to the voltage regulator at an output node is determined, the harmonic frequency data including one or more harmonic components; a converter control signal is determined based on the reactive power set point and the harmonic frequency data; the converter control signal is provided to the converter such that the converter produces a compensation current. The compensation current reduces an effect of them harmonic components and provides reactive power to the output node, and the amount of provided reactive power is based on the reactive power set point.

Implementations may include one or more of the following features. The amount of provided reactive power may be equal to the reactive power set point. The reactive power set point may be determined based on user input. The reactive power set point may be determined based on an amount of reactive power at the input node.

Implementations of any of the techniques described herein may include a voltage regulator, a load tap changer, an apparatus, a kit for retrofitting an existing voltage regulator, a controller for controlling a voltage regulator, a converter for use with a voltage regulator, or a process. The details of one or more implementations are set forth in the accompanying drawings and the description below. Other features will be apparent from the description and drawings, and from the claims.

DRAWING DESCRIPTION

Figure 10A:
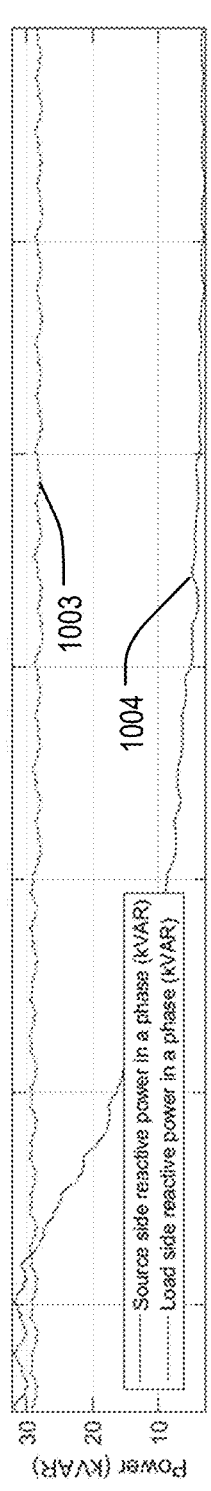
Figure 10B:
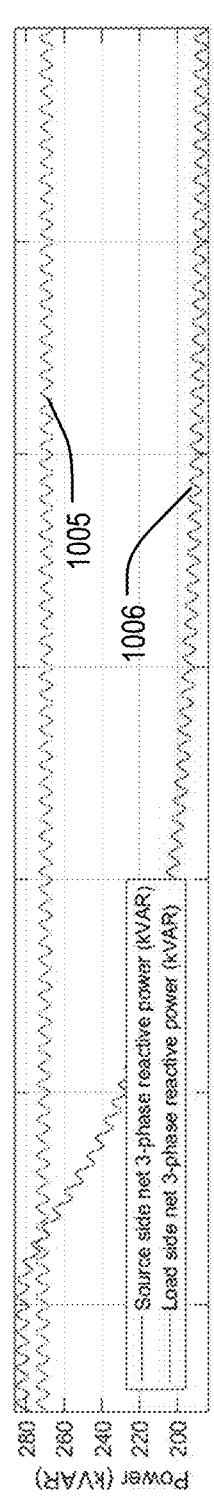
Figure 10C:
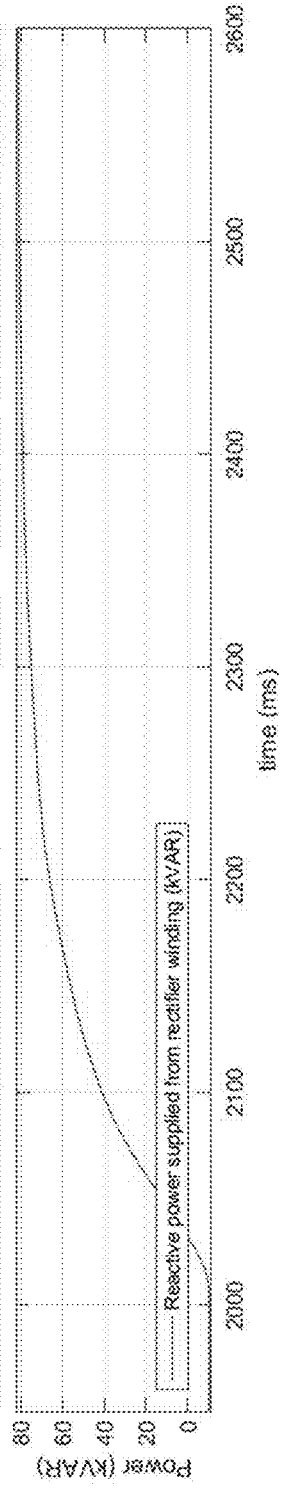

FIGS. 9A-9D are examples of simulated data.
FIGS. 10A-10C are examples of simulated data.
FIGS. 11A-11D are examples of simulated data.
FIGS. 12A-12C are examples of simulated data.
FIGS. 13A-13G are examples of simulated data.

DETAILED DESCRIPTION

Figure 1:
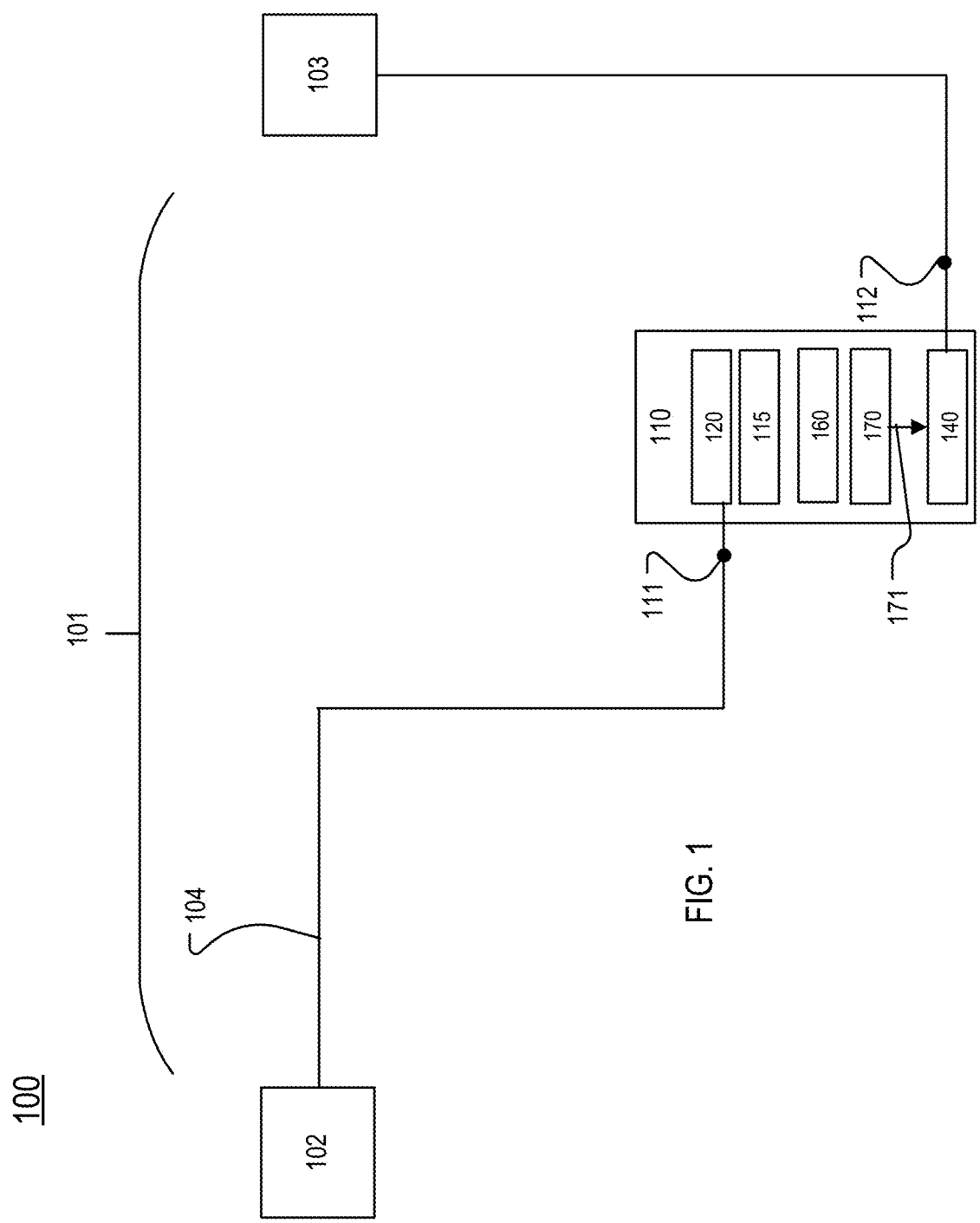
FIG. 1 is a block diagram of an example of an alternating-current (AC) electrical power system.

A voltage regulation device 110 that compensates for reactive power consumption of electrical loads 103 and for current harmonics produced by the loads 103 is discussed below. FIG. 1 is a block diagram of an example of an alternating-current (AC) electrical power system 100. The electrical power system 100 includes an electrical power distribution network 101 that transfers electricity between power source 102 and the electrical loads 103 through the voltage regulation device 110. The voltage regulation device 110 is any apparatus that is capable of regulating the voltage in the distribution network 101. For example, the voltage regulation device 110 may be a step voltage regulator that provides a constant voltage output under varying input voltages and load currents. A step voltage regulator includes taps and a load tap changer. The electrical power distribution network 101 may be, for example, an electrical grid, an electrical system, or a multi-phase electrical network that provides electricity to commercial and/or residential customers. The electrical power distribution network 101 may have an operating voltage of, for example, at least 1 kilovolt (kV), 12 kV, up to 34.5 kV, up to 38 kV, or 69 kV or higher, and may operate at a system frequency of, for example, 50-60 Hertz (Hz). The distribution path 104 may include, for example, one or more transmission lines, electrical cables, and/or any other mechanism for transmitting electricity.

The voltage regulation device 110 includes an input node 111, which is electrically connected to a primary (or main or series) winding 120, and an output node 112, which is electrically connected to a shunt winding 140. The input node 111 is electrically connected to the power source 102. The output node 112 is electrically connected to the loads 103. The voltage regulation device 110 also includes an electrical network 115 that provides one or more paths for current to flow between the input node 111 and the output node 112. The electrical network 115 may be, for example, an autotransformer that includes a winding or coil that is common to the primary winding 120 and the shunt winding 140.

The voltage regulation device 110 also includes a converter 170 and a control system 160, which is coupled to the converter 170. As discussed below, the control system 160 controls the converter 170 such that the converter 170 provides a compensation current 171 to the shunt winding 140. The compensation current 171 compensates for reactive power consumption by the loads 103. By compensating for reactive power consumption, the voltage regulation device 110 reduces the amount of reactive power that must be supplied by the source 102. The electrical power provided to the load 103 is the product of the current drawn by the load 103 and the voltage at the load 103. The electrical power has a real (or active) power component and an imaginary (or reactive) power component. Reactive power is measured in units of volt-ampere reactive (VAR). Reactive power increases as the difference between the phase of the voltage and the phase of the current at the load 103 increases and decreases as the difference between the phase of the voltage and the phase of the current at the load 103 decreases. Reactive power is zero for a linear load (for example, a load that does not include any inductors or capacitors). Reactive power is non-zero for a non-linear load.

The compensation current 171 also reduces or eliminates current harmonics produced by non-linear loads 103. This reduction or elimination may be referred to as harmonic compensation, harmonic current compensation, or harmonic filtering. Current harmonics are sinusoidal currents that have a frequency that is an integer multiple of the fundamental frequency. A linear load draws sinusoidal current at the fundamental frequency and generally does not create current harmonics. A non-linear load draws current that is not sinusoidal. A non-linear load may draw current in in short bursts or pulses or in any other manner that is not sinusoidal. The non-linear load distorts the current waveform, causing harmonic currents to flow into other parts of the electrical power distribution network 101. Examples of non-linear loads include variable speed drives (VSD), variable frequency drives (VFD), and other motor drivers; rectifiers; various renewable energy sources; and uninterruptable power supplies, just to name a few.

The compensation current 171 includes current components at the frequencies of the unwanted harmonic current components. The current components in the compensation current 171 are the same magnitude (or less) and are 180 degrees(° out of phase with the phase of the unwanted harmonic components. Thus, the current components in the compensation current 171 cancel (or reduce) the unwanted harmonic components at the output node 112.

The devices, equipment, and systems that are connected to the distribution system 101 are designed to operate at the fundamental frequency. Challenges in operating the devices, equipment, and systems may arise when current at one or more harmonics of the fundamental frequency flows in the distribution system 101. For example, the presence of harmonic currents may cause increased heating of the equipment and conductors in the distribution system 101. Moreover, devices such as variable speed drives (VSD) and variable frequency drives (VFD) may misfire and may cause irregularities in the operation of motors driven by the drives. For example, the misfiring of a VSD may result in torque pulsations of a motor driven by that VSD. Thus, it is desirable to reduce or eliminate current harmonics that may be generated at the loads 103.

Traditionally, step voltage regulators are used solely for voltage management in a distribution feeder. To manage reactive power flow in the distribution system, the step voltage regulator may be used with a capacitor bank. However, using a capacitor bank may cause challenges, such as, for example, switching transients, discrete step changes in reactive power injection, and relatively large maintenance and installation costs. On the other hand, the voltage regulation device 110 performs voltage management and also manages reactive power flow. Furthermore, the voltage regulation device 110 compensates for unwanted harmonic current components. Accordingly, the voltage regulation device 110 does not necessarily include active filters or capacitor banks and can perform reactive power compensation and harmonic compensation without such devices.

Figure 2:
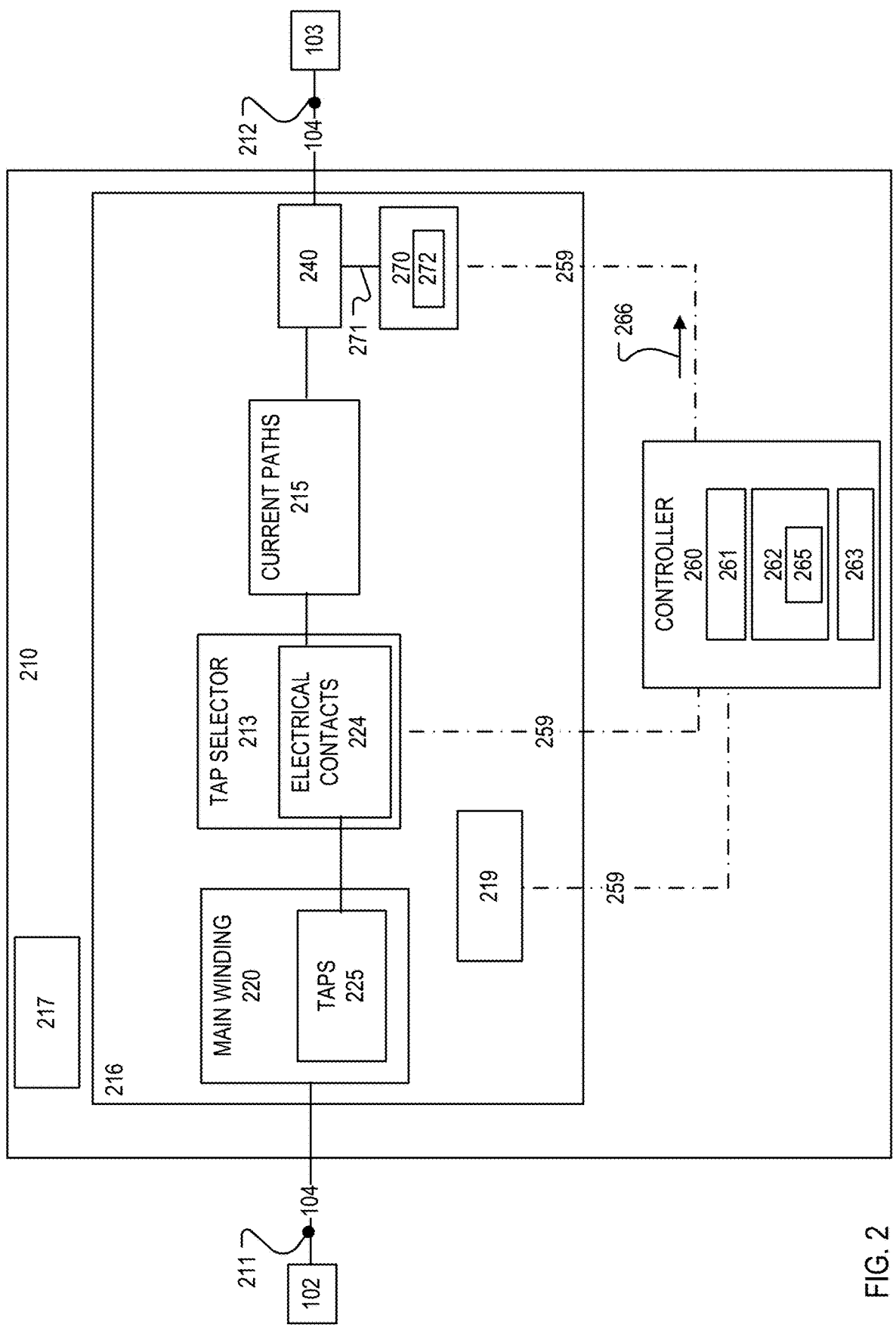
FIG. 2 is a block diagram of an example of a voltage regulation device.

FIG. 2 is a block diagram of a voltage regulation device 210. The voltage regulation device 210 is an example of an implementation of the voltage regulation device 110. The voltage regulation device 210 may be used in the electrical power distribution network 101.

The voltage regulation device 210 receives AC electrical power at an input node 211 and provides a regulated AC output at an output node 212. The input node 211 is electrically connected to an AC power source (such as the source 102 of FIG. 1). The output node 212 is electrically connected to a load (such as the load 103 of FIG. 1). The voltage regulation device 210 controls the voltage level at the output node 212 such that the voltage delivered to the electrical loads 103 (FIG. 1) is maintained within a desired or acceptable voltage range despite changes in the electrical load 103 and/or changes in the voltage supplied by the source 102 (FIG. 1). The voltage regulation device 210 also includes a converter 270 that produces a compensation current 271 that mitigates, reduces, or eliminates unwanted harmonic components at the output node 212. The compensation current 271 also controls an amount of reactive power at the output node 212.

The voltage regulation device 210 also includes a monitoring module 217, a tap selector 213, a main winding 220 that is electrically connected to the input node 211, and at least two taps 225 that are electrically connected to the main winding 220. The voltage regulation device 210 also includes a shunt winding 240, which is electrically connected to the output node 212. The converter 270 that provides the compensation current 271 to the shunt winding 240. The converter 270 may include a coil that magnetically couples to the shunt winding 240. An example of such a coil is the coil 576 of FIGS. 5 and 6.

The monitoring module 217 is any type of device capable of measuring or determining the voltage on the distribution path 104. For example, the monitoring module 217 may be a voltage sensor. The tap selector 213 may include, for example, motors, mechanical linkages, and/or electronic circuitry that is capable of connecting the load 103 to the source 102 through any of the taps 225. The voltage regulation device 210 also includes an electromagnetic circuit 234. Together, the taps 225, the main winding 220, the tap selector 213, and the electromagnetic circuit 234 form a voltage regulation operation module 216 for the voltage regulation device 210.

The tap selector 213 is configured to move an electrical contact 224 and place the electrical contact 224 on a particular one of the taps 225. When one or more of the electrical contacts 224 is connected to one or more of the taps 225, the main winding 220 is electrically connected to the output node 212. The taps 225 are separated from each other on the main winding 220, and the output voltage of the voltage regulation device 210 depends on the location of the selected tap on the main winding 220. Thus, by controlling which of the taps 225 is connected to the contact or contacts that carry the load current, the output voltage to the load 103 is also controlled. In this way, the voltage delivered to the electrical load 103 may be kept within the acceptable or desired range even if the voltage delivered from the power source 102 changes.

Figure 5:
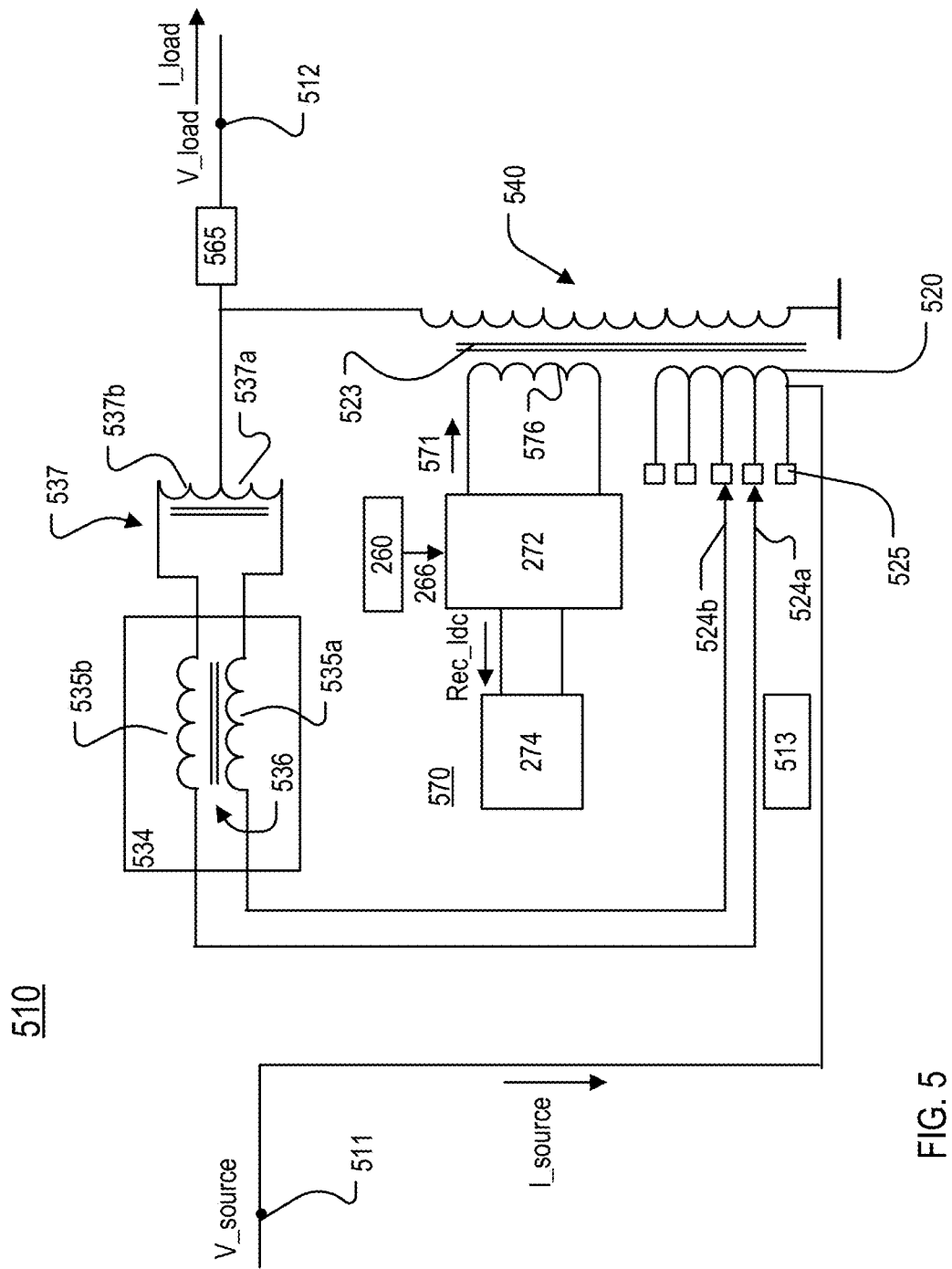
FIG. 5 is a block diagram of an example of a voltage regulation device.
Figure 6:
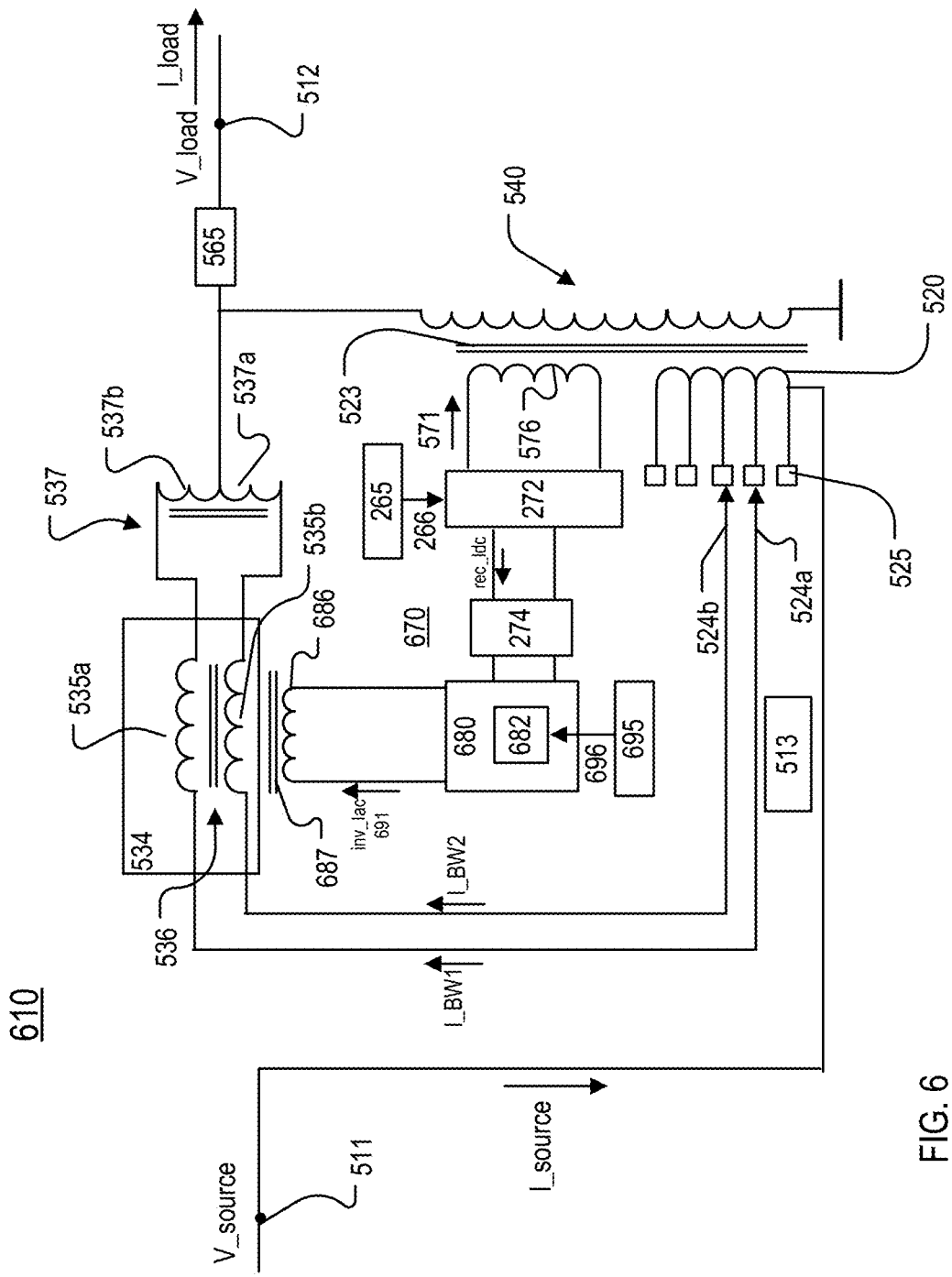
FIG. 6 is a block diagram of an example of a voltage regulation device.

The current paths 215 are any electrically conductive path that is able to conduct current from the contacts 224 to the load 103. The current paths 215 may be any type of electrical cable, transmission line, or wire. The current paths 215 may include an autotransformer such as shown in FIGS. 5 and 6.

The voltage regulation device 210 also includes a sensor system 219. The sensor system 219 includes one or more sensors that measure voltage and current in various portions of the voltage regulation device 210. For example, the sensor system 219 may be located anywhere along the current paths 215, at the input node 211, or at the output node 212.

Figure 3:
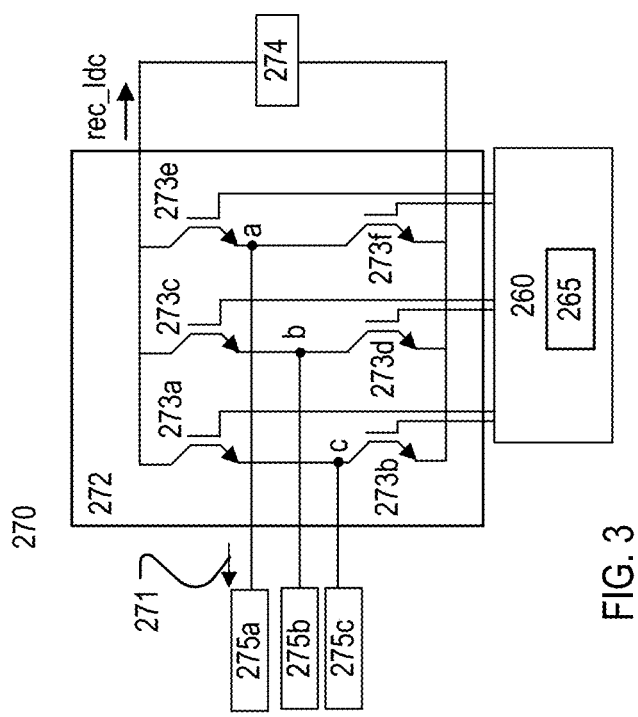
FIG. 3 is a schematic of an example of a converter.

Referring also to FIG. 3, which is a schematic of the converter 270, the converter 270 includes an electronic network 272 configured to convert AC electrical power at nodes a, b, c into a DC current rec_Idc. The DC current rec_Idc flows into a capacitor network 274. The capacitor network 274 is any type of device that is capable of storing electrical energy and releasing the stored electrical energy. For example, the capacitor network 274 may be one or more capacitors. The capacitor network 274 may be a battery. The voltage across the capacitor network 274 is V_DC. FIG. 3. In the example of FIG. 3, the converter 270 is a three-phase pulse width modulated (PWM) rectifier.

The electronic network 272 includes a plurality of controllable switches 273_1 to 273_6 and a storage network 274. Each of the controllable switches 273_1 to 273_6 may be a transistor or any other switch that is controllable between at least two stable states, one of which conducts electrical current through the switch and another of which prevents the flow of electrical current through the switch. Each of the controllable switches 273_1 to 273_6 may be, for example, a transistor such as an insulated gate bipolar transistor (IGBT). Each controllable switch 273_1 to 273_6 has a control element that is manipulated or controlled to determine the state of the switch 273_1 to 273_6. In the example shown in FIG. 3, the controllable switches 273_1 to 273_6 are transistors and the control element is the gate of the transistor. The control element of each controllable switch 273_1 to 273_6 is coupled to the control system 260 such that the control system 260 can control the state of each switch 273_1 to 273_6.

The electronic network 272 receives one phase of AC power at each of nodes a, b, c. Each node a, b, c is between the source of one of the transistors and the drain of another one of the transistors. The node a is electrically connected to AC power input 275a, the node b is electrically connected to AC power input 275b, and the node c is electrically connected to AC power input 275c. The AC power inputs 275a, 275b, 275c receive or sense AC power in the shunt winding 240. Each AC power input 275a, 275b, 275c may be, for example, a coil that magnetically couples to the shunt winding 240. The control system 260 controls the controllable switches 273a to 273f to generate the compensation current 271, which shapes the current at the AC power inputs 275a, 275b, 275c to reduce or eliminate harmonic current components and manage the reactive power.

The control system 260 includes a compensation module 265 that generates a converter command signal 266 that controls the electronic network 272 to produce the AC compensation current 271. The control system 260 is an electronic controller that includes an electronic processing module 261 and an electronic storage 262 coupled to the processing module 261. The electronic processing module 261 includes one or more electronic processors. The control system 260 also may include an input/output (I/O) interface 263. The I/O interface 263 is any type of manual (or tactile) or electronic I/O interface or user interface devices 263 that allow an operator of the voltage regulation device 210 or an autonomous process to communicate with the control system 260. The control system 260 stores machine-executable instructions, perhaps in the form of a computer program, on the electronic storage 262. The instructions include instructions that implement the compensation module 265.

Figure 4:
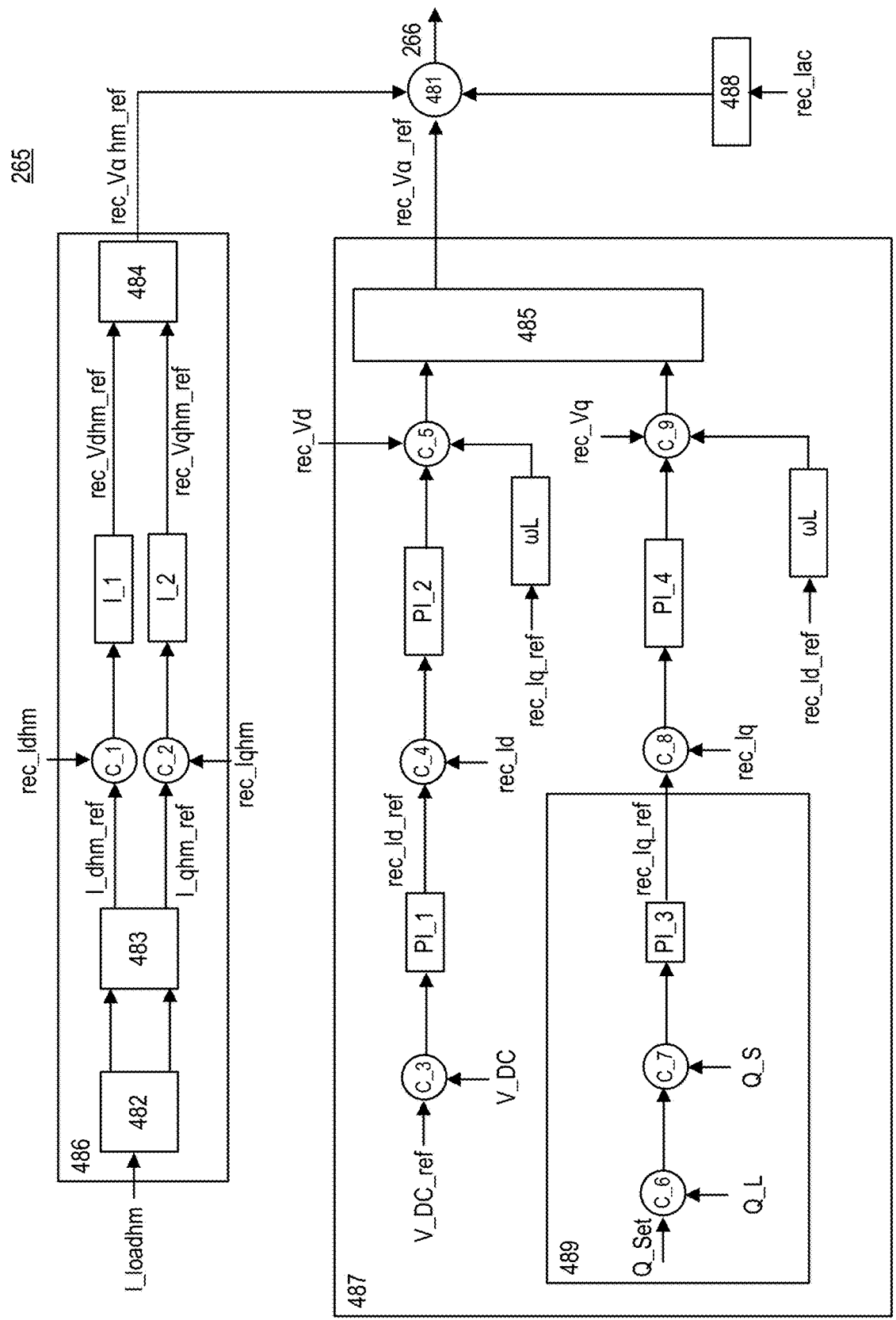
FIG. 4 is a block diagram of an example of a compensation module.

FIG. 4 is a block diagram of the compensation module 265. The compensation module 265 includes a harmonic compensation module 486 and a reactive power compensation module 487. The outputs of the harmonic compensation module 486 and the reactive power compensation module 487 are combined at an adder module 481 to produce the converter control signal 266.

The harmonic compensation module 486 includes a transformation module 482. The current harmonics that are to be removed or reduced (I_loadhm) are input into the transformation module 482. The current harmonics that are to be removed or reduced (I_loadhm) may be a series of sinusoidal signals, each having a frequency that is a multiple N of the fundamental frequency of the distribution network 101, where N is an integer number that is greater than 1. For example, if the fundamental frequency of the network 101 is 60 Hz, the third current harmonic is a sinusoidal current at a frequency of 180 Hz.

The current harmonics that are to be removed or reduced (I_loadhm) may be provided by an operator of the voltage regulation device 110 or may be based on measured harmonic currents that are in the load current I_1 and/or in other parts of the distribution network 101. In implementations in which the current harmonics that are to be removed or reduced (I_loadhm) are based on measured data, the data may be measured by a current sensor and a spectrum analyzer that are part of the sensor system 219. The measurements may be provided to the control system 260 by the sensor system 265 and analyzed by the control system 260 such that the control system 260 determines the current harmonics to be removed or reduced.

The transformation module 482 transforms the three-phase load current harmonics into direct (d) and quadrature (q) components using the Park and Clark transformations. The Clark transformation projects a three-phase quantity (in this example, the three-phase harmonic current components I_loadhm) onto a two-dimensional stationary coordinate system defined by an α axis and a β axis that is orthogonal to the α axis. The Clark transformation is shown in Equation (1):

$$i_{\alpha\beta} = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}\begin{bmatrix} i_a \\ i_b \\ i_c \end{bmatrix},$$ Equation (1)

where ia, ib, ic are the instantaneous harmonic currents in the AC inputs 275a, 275b, 275c, respectively, and $i_{\alpha\beta}$ is a vector that includes a component along the α axis and a component along the β axis. The Park transformation converts rotates the stationary α, β axes at a frequency ω (which corresponds to the frequency of the harmonic current component). The Park transformation is shown in Equation (2):

$$i_{dq} = \begin{bmatrix} \cos(\theta) & \sin(\theta) \\ -\sin(\theta) & \cos(\theta) \end{bmatrix}\begin{bmatrix} i_\alpha \\ i_\beta \end{bmatrix},$$ Equation (2)

where $i_{dq}$ is a vector that includes a component along the d axis and a component along the q axis, and θ is the angle between the d-q and α-β reference frames. Equations (1) and (2) express relationships for current values. However, Equations (1) and (2) may be used with other quantities, such as, for example, voltage.

The direct (d) and quadrature (q) components of the harmonic load current are filtered at a filtering module 483. The filtering module 483 is a low-pass filter that reduces or removes higher-order components of the harmonic load current. For example, the filtering module 483 may be configured to reduce or remove components that have a frequency that is greater than a threshold frequency above which the harmonic components have relatively small amplitudes. The threshold frequency may be stored on the electronic storage 264 or may be entered by an operator of the voltage regulation device 110. The frequency threshold may be expressed as a frequency or as an integer value of the harmonic components that should not be considered. The output of the filtering module 483 are direct (d) and quadrature (q) current reference components I_dhm_ref and I_qhm_ref, respectively.

The harmonic compensation module 486 may be implemented without the filtering module 483. In implementations that do not include the filtering module 483, the direct (d) and quadrature (q) current reference components I_dhm_ref and I_qhm_ref are the outputs of the transformation module 482.

The direct current reference component (I_dhm_ref) is compared to an active current command (rec_Idhm) at a comparator module C_1. The quadrature current reference component (I_qhm_ref) is compared to a reactive current command (rec_Iqhm) at a comparator module C_2. The commands rec_Idhm and rec_Iqhm are measured values output by the converter 270. Each comparator modules C1 and C2 is configured to determine a difference between two inputs. The output of the comparator C1 is provided to an integrator module I_1, which determines a direct voltage reference (rec_Vdhm_ref) based on the difference produced by the comparator C_1. The output of the comparator C_2 is provided to an integrator module I_2, which determines a quadrature voltage reference (rec_Vqhm_ref) based on the difference produced by the comparator C_2.

The direct voltage reference (rec_Vdhm_ref) and the quadrature voltage reference (rec_Vqhm_ref) are provided to a transformation module 484. The transformation module 484 implements an inverse Park transformation that determines a voltage component for the harmonic compensation along the α axis (rec_Vα_hm_ref).

The reactive power compensation module 487 includes a comparator C_3, which compares a DC reference voltage (V_DC ref) to the measured DC voltage (V_DC) across the capacitor network 274. The reference voltage (V_DC ref) is the DC voltage that the control system 260 seeks to maintain across the capacitor network 274. The comparator C_3 determines the difference between the DC reference voltage (V_DC ref) and the measured DC voltage (V_DC) and provides the difference to a proportional-integral (PI) module PI_1. The PI_1 module determines a direct current reference (rec_Id_ref), which is provided to a comparator module C_4. The comparator module determines a difference between the direct current reference (rec_Id_ref) and a direct current control command (rec_Id). The difference is provided to a second PI module PI_2. A comparator module C_5 determines a direct voltage reference (rec_Vd_ref) based on the output of the PI module PI_1, the reference quadrature current value (rec_Iq_ref), and a direct voltage control command (rec_Vd). The values of rec_Id and rec_Vd are measured output values of the converter 270.

The reactive power compensation module 487 also includes a reactive power set point module 489, which includes comparator modules C_6 and C_7 and a PI module PI_3. The comparator module C_6 compares a reactive power set point (Q_set) to a reactive power at the loads 103 (Q_L). The reactive power set point (Q_set) is an amount of reactive power that the voltage regulation device 110 is configured to provide. The reactive power set point (Q_set) may be a constant value, may be a value that the operator of the voltage regulation device 110 is able to set and change during the lifetime of the voltage regulation device 110, or may be updated by an automated process based on conditions in the distribution network 101. The reactive power compensation module 487 produces a quadrature reference current value (rec_Iq_ref) that is used to control the phase angle of the current compensation signal 271 so that the converter 270 controls the phase angle difference between the voltage and current at the load 103. This allows the reactive power compensation module 487 to inject reactive power (by causing the phase of the current to lead the phase of the voltage) or to remove reactive power (by causing the phase of the current to lag the phase of the voltage).

The difference determined by the comparator module C_6 is provided to the comparator module C_7. The comparator module C_7 compares the difference between the reactive power set point (Q_set) and the reactive power at the loads 103 (Q_L) to the reactive power at the source 102 (Q_S). The reactive power at the load 103 (Q_L) is a measured value that depends on the configuration of the load 103. By compensating for reactive power at the load 103, the reactive power compensation module 487 is able to reduce the amount of reactive power that the source 102 provides. The output of the comparator module C_7 is provided to the PI module PI_3, which determines a quadrature current reference value (rec_Iq_ref). Unlike some traditional approaches to reactive power compensation, the quadrature current reference value (rec_Iq_ref) is not necessarily zero. The quadrature current reference value (rec_Iq_ref) is compared to a reference quadrature value (Iq_ref) at a comparator module C_8. The difference between the quadrature current reference value (rec_Iq_ref) and the reference quadrature value (Iq_ref) is provided to a PI module PI_4. The output of the PI module PI_4, a reference direct current value (rec_Id_ref), and a direct voltage control command (rec_Vq) are input to a comparator C_9, which determines a quadrature voltage reference (rec_Vq_ref).

The direct voltage reference (rec_Vd_ref) and the quadrature voltage reference (rec_Vq_ref) are provided to a transformation module 485. The transformation module 485 implements an inverse Park transformation that determines a voltage component for the reactive power compensation along the α axis (rec_Vα_ref). The voltage component for the harmonic compensation along the α axis (rec_Vα_hm_ref) and the voltage component for the reactive power compensation along the α axis (rec_Vα_ref) are added at the adder 481 to produce converter command signal 266. Furthermore, in the implementation shown in FIG. 4, the compensation module 265 includes a damping module 488. The damping module 488 may be, for example, a low pass filter. The damping module 488 filters the AC output current of the converter 270 (the compensation current 271) and provides the filtered quantity to the adder 488. The damping module 488 is used to reduce transient effects that could damage the converter 270 or cause the converter 270 to malfunction.

The converter command signal 266 is provided to the converter 270 to produce the compensation current 271. Specifically, the converter command signal 266 controls the state of the controllable switches 273*a* to 273*e* to modulate DC power into the AC compensation current 271, where the AC compensation current 271 has an amplitude, frequency, and phase that injects or removes reactive power at the output node 112 and removes or reduces the harmonic current components.

Furthermore, in some implementations, the voltage regulation device 210 includes an inverter in addition to the converter 270. FIG. 6 shows an example of a voltage regulation device 610 that includes an inverter 680. As discussed with respect to FIG. 6, the inverter 680 is electrically connected to the capacitor network 274. The inverter converts DC power stored in the capacitor network 274 into an AC power signal that is provided to the source-side of the voltage regulation device 210. In implementations that include an inverter, the control system 260 may also be configured to control the inverter in addition to controlling the converter 270. In these implementations, the electronic storage 262 also stores instructions for controlling the inverter. In other implementations, the control for the inverter 680 is implemented by a separate control system.

In implementations in which the control system 260 is an electronic controller, the processing module 261 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 262 may be any type of electronic memory that is capable of storing data and instructions in the form of computer programs or software, and the electronic storage 262 may include volatile and/or non-volatile components. The electronic storage 262 and the processing module 261 are coupled such that the processing module 261 is able to access or read data from and write data to the electronic storage 262.

The I/O interface 263 may be any interface that allows a human operator and/or an autonomous process to interact with the control system 260. The I/O interface 263 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 263 also may allow communication without physical contact through, for example, an IEEE 802.11, Bluetooth, or a near-field communication (NFC) connection. The control system 260 may be, for example, operated, configured, modified, or updated through the I/O interface 263.

The I/O interface 263 also may allow the control system 260 to communicate with systems external to and remote from the voltage regulation device 210. For example, the I/O interface 263 may include a communications interface that allows communication between the control system 260 and a remote station (not shown), or between the control system 260 and a separate electrical apparatus in the power system 100 (FIG. 1) using, for example, the Supervisory Control and Data Acquisition (SCADA) protocol or another services protocol, such as Secure Shell (SSH) or the Hypertext Transfer Protocol (HTTP). The remote station may be any type of station through which an operator is able to communicate with the control system 260 without making physical contact with the control system 260. For example, the remote station may be a computer-based work station, a smart phone, tablet, or a laptop computer that connects to the control system 260 via a services protocol, or a remote control that connects to the control system 260 via a radio-frequency signal. The control system 260 may communicate information such as the determined tap position through the I/O interface 263 to the remote station or to a separate electrical apparatus.

In the example of FIG. 2, the control system 260 is coupled to the converter 270, the tap selector 213, and the sensor system 219 via data links 259. The data links 259 are any path capable of transmitting data. For example, the data link 259 may be a network cable (such as an Ethernet cable), or the data link 259 may be a wireless connection that is capable of transmitting data. In other implementations, the control system 260 is only coupled to the converter 270 and only controls the converter 270. In these implementations, the tap selector 213 and the sensor system 219 are coupled to one or more separate controllers.

FIG. 5 is a block diagram of an example of a voltage regulation device 510 that includes a converter 570. The voltage regulation device 510 manages reactive power and performs harmonic current filtering on the load side of the voltage regulation device 510 (for example, at an output node 512) with the converter 570. The voltage regulation device 510 may be enclosed in a housing (not shown).

The converter 570 is an implementation of the converter 270 discussed with respect to FIG. 2. The converter 570 includes the electronic network 272 and the capacitor network 274. The converter 570 includes a winding 276 that is electrically connected to the AC side of the electronic network 272. The winding 276 is made of an electrically conductive material, such as a metal material.

The voltage regulation device 510 receives AC power at an input node 211. The input node 211 has a voltage (V_source), and an AC current (I_source) flows in the input node 211. The input node 211 is electrically connected to a main winding 520. The main winding 520 is made of an electrically conductive material, such as an electrically conductive metal. The voltage regulation device 510 also includes a shunt winding 540, which is also made of an electrically conductive material. The shunt winding 540, the converter winding 276, and the main winding 520 are wound around a magnetic core 523. Each of the wound shunt winding 540, and the converter winding 576, and the main winding 520 may form, for example, a helix. Each portion of the winding 520, the winding 576, or the winding 540 that encircles the core 523 is referred to as a turn. The series winding 520 has M turns, where M is an integer number that is greater than one. The shunt winding 540 has N turns, where N is an integer number that is greater than one. The winding 576 includes P turns, where P is an integer number that is greater than 1. M, N, and P may be the same or different values. In other words, the shunt winding 540, the converter winding 576, and the main winding 520 may have different numbers of turns.

The magnetic core 523 is made of a ferromagnetic material, such as, for example, iron or steel. The magnetic core 523 may be a gapped core or an un-gapped core. In implementations in which the core 523 is an un-gapped core, the core 523 is a contiguous segment of ferromagnetic material. A gapped core includes a gap that is not ferromagnetic material. The gap may be, for example, air, nylon, or any other material that is not ferromagnetic. Thus, in implementations in which the core 523 is a gapped core, the core includes at least one segment of a ferromagnetic material and at least one segment of a material that is not a ferromagnetic material.

The input node 511 receives electricity from an AC source (such as the source 102 of FIG. 1) via the distribution path 104. When the input node 211 receives electricity, the main winding 520 is energized and a time-varying (AC) current flows in the main winding 520. The main winding 520, the shunt winding 540, and the converter winding 576 are magnetically coupled by the core 523. Thus, when the AC current flows in the main winding 520, a corresponding time-varying current is induced in the shunt winding 540 and the converter winding 576.

The main winding 520 includes T taps 525, where T is an integer number that is greater than one. Only one of the T taps is labeled in FIG. 5. During operational use of the voltage regulation device 510, there is a potential difference between any two adjacent taps 525. The taps 525 are made of an electrically conductive material (such as, for example, metal), and the taps 525 are electrically connected to the main winding 520. Each tap is separated from the nearest other tap, with at least one of the M turns being between any two adjacent taps 525.

The voltage regulation device 510 also includes movable contacts 524a and 524b. Each movable contact 524a, 524b is electrically connected to an electromagnetic circuit 534, which is a reactor or a preventive autotransformer. The electromagnetic circuit 534 includes two coils 535a, 535b that are wound around a common core 536. The contact 524a is electrically connected to the coil 535a, and the contact 524b is electrically connected to the coil 535b. The coils 535a and 535b are also electrically connected to the output node 512 via an equalizer 537. The equalizer includes coils 537a and 537b.

The voltage at the output node 512 (V_load) is determined by which one or two of the taps 525 is selected by (in electrical contact with) the electrical contacts 524a and 524b. A tap selector 513, which includes a driving system, controls the motion and position of the electrical contacts 524a and 524b. The driving system may include, for example, mechanical linkages and motors that are used to move either or both of the moveable contacts 524a, 524b to a particular one of the taps 525. The tap selector 513 and driving system is shown as being physically separated from the movable contacts 524a and 524b, but may be implemented to be mechanically coupled to the movable contacts 524a and 524b or to a device that is mechanically coupled to the movable contacts 524a and 524b.

When both of the electrical contacts 524a and 525b are in electrical contact with the same one of the taps 525, the tap position is a non-bridging position. When one of the electrical contacts 524a, 524b is in electrical contact with one of the taps 525 and the other of the electrical contacts 524a, 524b is in electrical contact with another one of the taps 525, the tap position is a bridging position. FIG. 5 shows an example of a bridging position.

The voltage regulation device 510 makes a step or a tap change each time one of the electrical contacts 524a and 524b is removed from its current tap and placed into electrical contact with a different tap. In other words, a step change is an actuation from one acceptable steady-state tap position to an adjacent steady-state tap position. When one of the electrical contacts 524a or 524b is disconnected from one of the taps 525, the voltage regulation device 310 is in a switching state or is performing a switching operation.

The control system 260 provides the converter control signal 266 to the electronic network 272 to cause the electronic network 272 to generate an AC compensation current 571. The characteristics (amplitude, frequency, and phase) of the AC compensation current 571 are determined by the manner in which the converter control signal 266 controls the electronic network 272, and the converter control signal 266 is determined by the compensation module 265. In the example of FIG. 5, the harmonic current components that are to be removed or reduced (I_loadhm) are the harmonic current components of the load current (I_load). The load current (I_load) is sensed by a sensor 565, which provides data related to the harmonic current components to be reduced (I_loadhm) to the control system 260. The value of Q_set (the reactive power set point) may be determined by an operator of the voltage regulation device 510 or determined based on the conditions. For example, the reactive power set point may be a value that is relative to the reactive power provided by the source 102 or relative to the reactive power at the input node 511.

The AC compensation current 571 flows as current in the converter winding 576, and a corresponding AC current is induced in the shunt winding 540. The corresponding current that is induced in the shunt winding 540 combines with the load current (I_load). Because the compensation current 571 has characteristics that were determined using the compensation module 265 and with the information regarding the harmonic components in the load current (I_load) to be mitigated from the sensor 565 and the set point (Q_set) of the reactive power as the inputs, the characteristics of the compensation current 571 are consistent with the characteristics that would provide the desired amount of reactive power and harmonic compensation. Thus, when the current that is induced in the shunt winding 540 combines with the load current (I_load), the desired amount of reactive power is injected or removed at the output node 512 and the current harmonics are reduced or eliminated at the output node 512.

FIG. 6 is a block diagram of a voltage regulation device 610. The voltage regulation device 610 is the same as the voltage regulation device 510 (FIG. 5), except the voltage regulation device 610 includes an inverter 680. The inverter 680 converts DC power in the capacitor network 274 into an AC inverter compensation current 691 (inv_Iac). The inverter 680 includes an electronic network 682, which is electrically connected to the capacitor network 274 and an inverter coil 686. The inverter coil 686 is wound around a magnetic core 687. The coil 535b is also wound around the core 687. The inverter coil 686 is thus magnetically coupled to the coils 535a and 535b through the cores 687 and 536.

The inverter 680 generates an inverter compensation current 691 that controls the current flow in the windings 535a, 535b to allow arc-less operation of the contacts 524a, 524b. To change the voltage at the output node 212, the electrical contacts 524a and/or 524b are removed from one of the taps 525 and placed on another one of the taps 525. If current is flowing in the contact or contacts that are moved, arcing may occur when the electrical contact is removed from the tap. If no current flows in the electrical contact when it is removed from the tap, no arcing occurs. The inverter compensation current 691 controls the currents I_BW1, I_BW2 in the respective winding 535a, 535b to thereby control the current in the respective contact 524a, 524b prior to initiating a switching operation.

Figure 7:
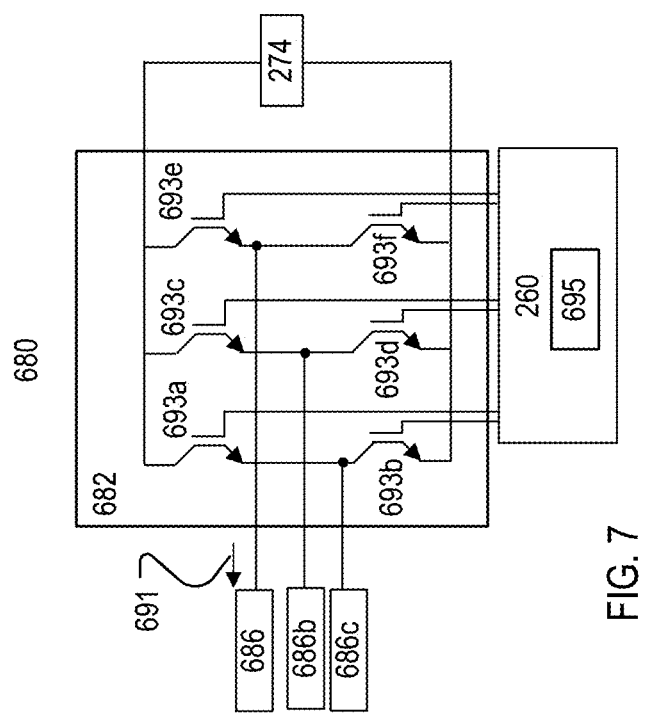
FIG. 7 is a schematic of an example of an electrical network for an inverter.

FIG. 7 is a schematic of an example configuration of the electronic network 682. The electronic network 682 includes controllable switches 693a to 693e. The controllable switches 693a to 693e may be, for example, transistors such as IGBTs. The state of the controllable switches 693a to 693e is controlled by an inverter control signal 696. The inverter control signal 696 is generated by an inverter control module 695 that is part of the control system 260. For example, the inverter control module 695 may be implemented as a collection of machine-executable instructions that are stored on the electronic storage 262. In some implementations, the inverter control module 695 is implemented on a separate electronic controller.

Figure 8:
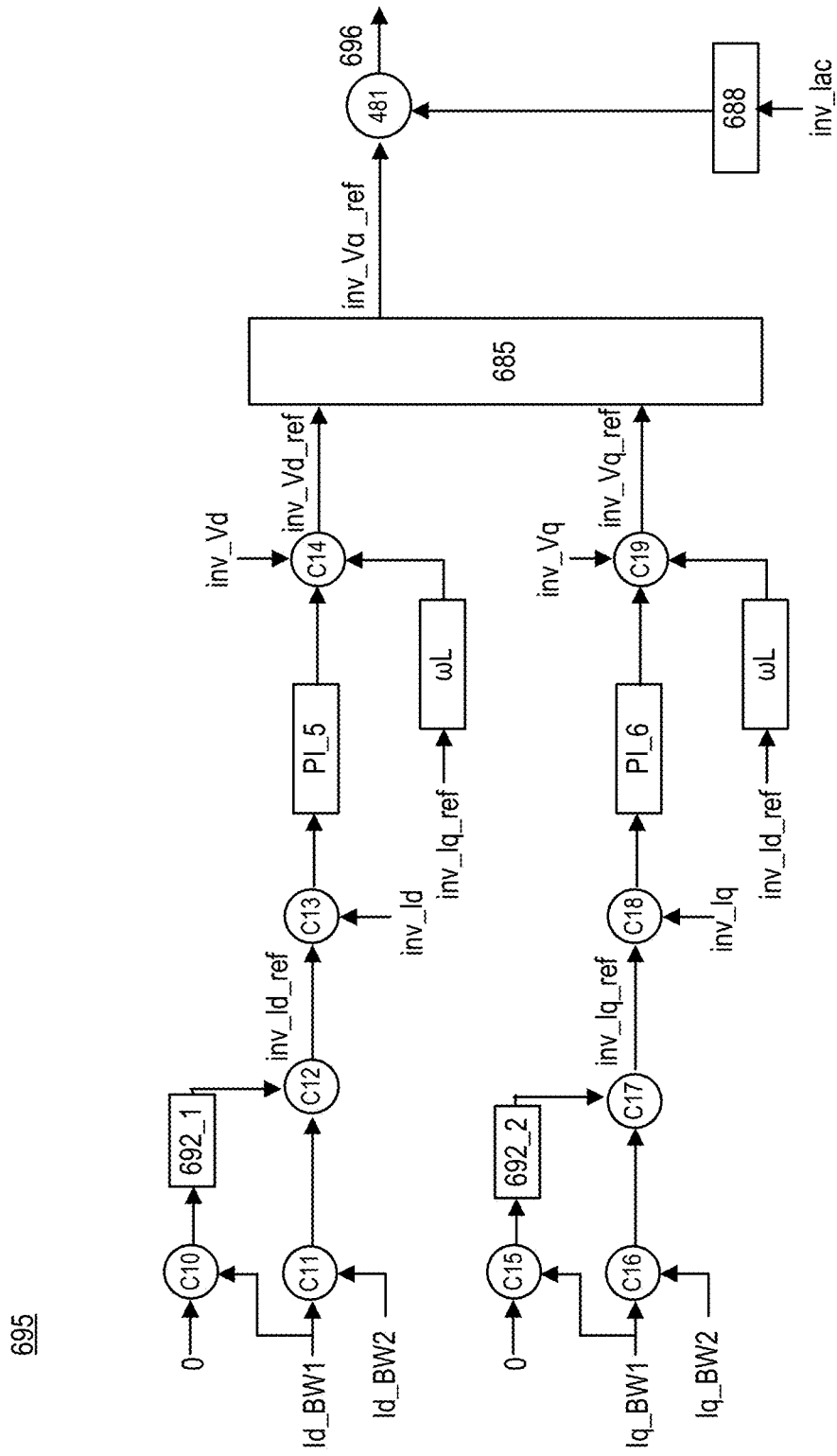
FIG. 8 is a block diagram of an example of a compensation module for an inverter.

FIG. 8 is a block diagram of the inverter control module 695. The inverter control module 695 produces the inverter control signal 696. The inverter control signal 696 is a voltage signal that, when applied to the electronic network 682, causes the inverter 680 to produce the AC inverter compensation current 691. The AC inverter compensation current 691 flows as a current on the coil 686 and induces a corresponding current in the coils 535a and 535b. The characteristics (amplitude, frequency, and phase) of the inverter compensation current 691 are such that the induced current shapes the AC current in the coils 535a and 535b to have desired properties. In the example of FIG. 8, the inverter compensation current 691 is used to cause the AC current in the coils 535a and 535b to have zero amplitude amplitude to enable arc-less switching operations.

The inverter control module 696 receives measured direct current values in the coil 535a (I_BW1) and the coil 535b (I_BW2). The direct current values are compared to each other at a comparator C11, and the direct current value I_BW1 is compared to the target current value (0 in this example) at a comparator C10. The difference between the target current value and the direct current value I_BW1 is provided to an integrator module 691_1 and to a comparator C12 to produce an inverter direct current reference value (inv_Id_ref). The inverter direct current reference value (inv_Id_ref) is compared to a measured direct current produced by the inverter 680 (inv_Id). The output of the comparator is provided to a PI module PI_5, and the output of the PI module PI_5 is compared to a measured direct voltage produced by the inverter 680 (inv_Vd). The resulting inverter direct voltage reference (inv_Vd_ref) is provided to a transformation block 685. The inverter control module 695 determines a quadrature voltage reference (inv_Vq_ref) in a similar manner using measured quadrature components Iq_BW1, Iq_BW2, inv_Id, and inv_Iq.

The transformation block 685 implements an inverse Park transformation. The transformation block 685 transforms the inverter direct current reference value (inv_Id_ref) and the inverter quadrature current reference value (inv_Iq_ref) into an inverter voltage reference signal (inv_Vα_ref) along the α axis. The measured AC current output by the inverter 680 (inv_Iac or the compensation current 691) is provided to a damping module 688. The damping module 688 may be, for example, a low-pass filter that removes or reduces transients. The output of the damping module 688 and the inverter voltage reference signal (inv_Vα_ref) are added at an adder module 681 to produce the inverter control signal 696. The inverter control signal 696 is provided to the inverter 680 and causes the electrical network 692 to produce the inverter compensation current 691 that drives the current in the coils 535*a* and 535*b* to zero.

FIGS. 9A-9D and 10A-10C show results from a simulation. FIGS. 9A-9D and 10A-10C have the same time scale on the horizontal axis. The results were produced by simulating the performance of a voltage regulation device that includes the converter 270, such as the device 510 (FIG. 5) or 610 (FIG. 6), in the IEEE 34 bus distribution system. The converter 270 was configured to suppress harmonic components while supplying 100 kVAR of reactive power to the load. In the simulation, the converter 270 began operation at time=2 seconds (s). The initial reference value for the rectifier quadrature current component (rec_Iq_ref) was zero (0), and the reactive power set point (Q_set) was set to be 33.33 kVAR (per phase). A harmonic load that generated harmonic components was included in the simulation and was switched on at the beginning of the simulation (and thus is present in the data shown).

FIG. 9A includes a plot 901, which is the reactive power set point (Q_set) in units of kVAR as a function of time, and a plot 902, which is the converter 270 reactive power output in units of kVAR as a function of time. FIG. 9B shows the DC voltage across the capacitor network 274 (V_DC) as a function of time. FIG. 9C shows the AC side rectifier current (rec_Iac) as a function of time. FIG. 9D shows the AC side rectifier voltage (rec_Vac) as a function of time.

FIG. 10A includes a plot 1003 and a plot 1004. The plot 1003 is the load-side reactive power (for example, the reactive power at the output node 512) in one phase in units of kVAR as a function of time. The plot 1004 is the source-side reactive power (for example, the reactive power at the input node 511) in one phase in units of kVAR as a function of time. FIG. 10B includes a plot 1005 and a plot 1006. The plot 1005 shows the load-side net three-phase reactive power in units of kVAR as a function of time. The plot 1006 shows the source-side net three-phase reactive power in units of kVAR as a function of time. FIG. 10C shows the reactive power supplied by the rectifier winding 576 in units of kVAR as a function of time.

The converter 270 began operation at 2 s (2000 ms). After the converter 270 begins operation, the compensation module 265 controls the converter 270 to increase reactive power output until the source-side reactive power reaches the power required by the set point (Q_set). As shown in FIG. 9A, after the converter 270 begins operation at 2 s, the reactive power produced by the rectifier increases until reaching the reactive power set point (Q_set) of 33.33 kVAR. The rectifier reactive power reaches the reactive power set point (Q_set) at about 2400 ms (2.4 s). As shown in FIGS. 10A and 10B, the reactive power provided to the load remains constant over time, both in a single phase (FIG. 10A) and across all phases (FIG. 10B). However, the reactive power provided by the source begins to decrease at around 2 s (2000 ms) as the reactive power provided by the converter increases. Thus, the converter 270 reduces the amount of reactive power that must be provided by the source 102.

FIGS. 11A-11D and 12A-12C show results from another simulation. FIGS. 11A-11D and 12A-12C have the same time scale on the horizontal axis. The results were produced by simulating the performance of a voltage regulation device that includes the converter 270, such as the device 510 (FIG. 5) or 610 (FIG. 6), in the IEEE 34 bus distribution system. The converter 270 was configured to suppress harmonic components while supplying with sufficient reactive power such that the reactive power supplied by the source 102 was 8.334 kVAR lower per phase than the reactive power consumed by the load 103 per phase. In the simulation, the converter 270 began operation at time=2 seconds (s). The initial reference value for the rectifier quadrature current component (rec_Iq_ref) was zero (0), and the reactive power set point (Q_set) was set to be 8.334 kVAR lower (per phase) than the measured load reactive power (Q_L).

Figure 11A:
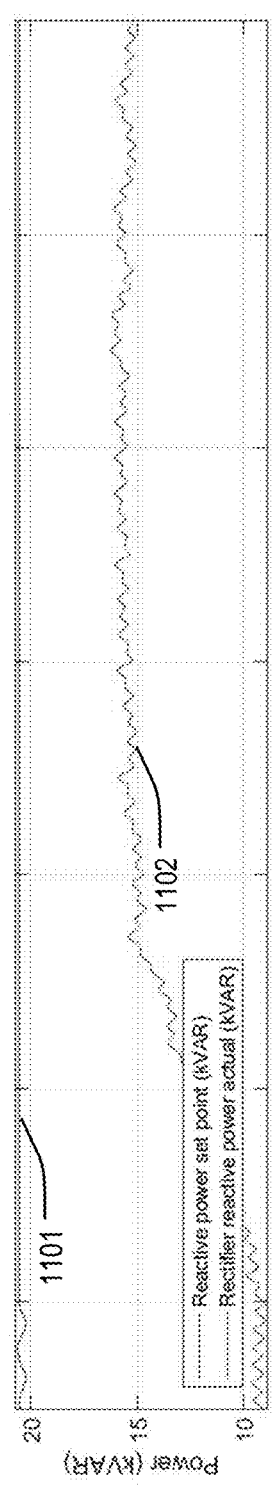
Figure 11B:
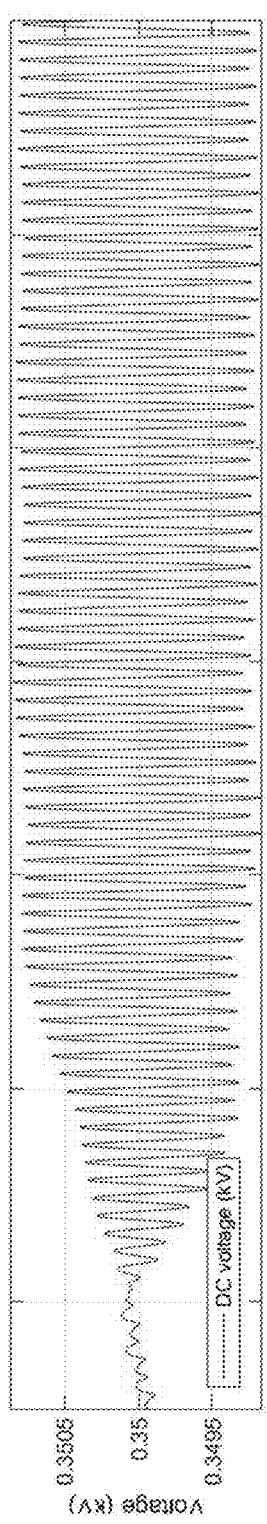
Figure 11C:
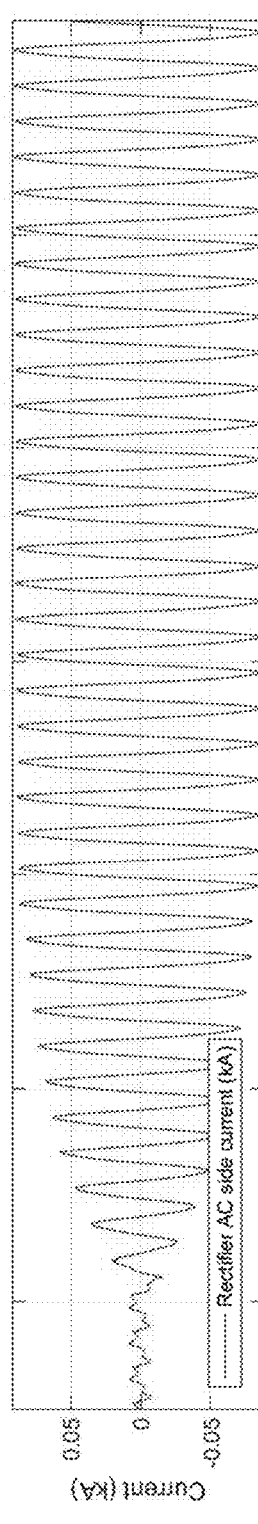
Figure 11D:
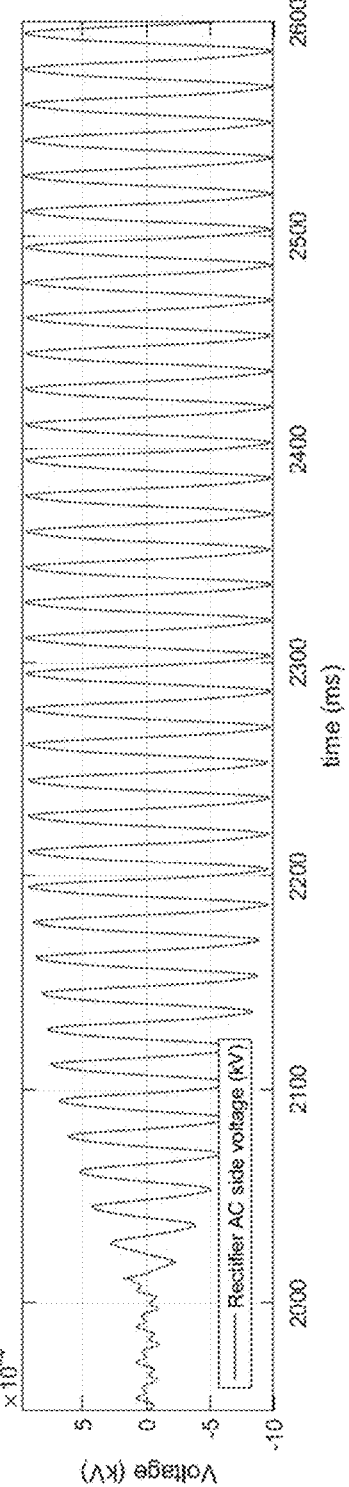

As shown in FIG. 11A, the reactive power provided by the source (Q_S) varies prior to the converter 270 beginning operation. However, after the converter 270 begins operating at 2 s (2000 ms), the reactive power supplied by the converter 270 increases until the source-side reactive power (per phase) is 8.334 kVAR lower than the load-side reactive power (Q_L).

FIGS. 13A-13G show data from another simulation. The data in FIGS. 13A-13F relate to a single phase of a voltage regulation device such as the device 510 (FIG. 5) or the device 610 (FIG. 6). FIGS. 13A-13G have the same time scale on the horizontal axis, the time scale begins at 0.6 s. In the simulation, the converter 270 was switched on at 0.1 s and the harmonic sources were switched on at 0.6 s, which is at the origin of the horizontal axis in FIGS. 13A-13G. The harmonic sources were used to simulate a harmonic load.

FIG. 13A shows the load current (I_load) and the source-side current (the sum of the current in the coils 535*a* and 535*b*) as a function of time. The load current and the current in the coils 535*a* and 535*b* are distorted and are not purely sinusoidal due to the current harmonics produced by the harmonic load. FIGS. 13B-13G show, respectively, the amplitude of the fifth, seventh, eleventh, thirteenth, seventeenth, and nineteenth harmonics of the load current and the source current as a function of time. The load current harmonics are labeled in FIGS. 13B-13G as 1301_B to 1301_G, respectively. The source current harmonics are labeled in FIGS. 13B-13G as 1302_B to 1301_G, respectively.

As shown in FIGS. 13B-G, the amplitude of the load harmonic components remains substantially constant over time because the load is a harmonic load. However, the converter 270 with the compensation module 265 reduces the amplitude of the harmonic currents on the source side to zero or near zero.

These and other implementations are within the scope of the claims.

What is claimed is:

1. A voltage regulation device configured to maintain a voltage in an alternating current (AC) electrical power distribution network to within a range of voltages, the voltage regulation device comprising:
   an input node configured to receive electrical power from an electrical power source;
   a primary winding electrically connected to the input node;
   an output node configured to provide electrical power to a load;

a shunt winding electrically connected to the output node;
a converter configured to provide a compensation current to the shunt winding; and
a control system configured to:
  determine a harmonic compensation signal based on harmonic frequency data, the harmonic frequency data comprising one or more harmonic components;
  determine a reactive power compensation signal based on a reactive power set point; and
  control the converter based on the determined harmonic compensation signal and the determined reactive power compensation signal to produce an output compensation signal, wherein the output compensation signal is configured to reduce the one or more harmonic components in a current that flows in the output node and to control an amount of reactive power at the output node.

2. The voltage regulation device of claim 1, wherein each harmonic component is a sine wave at a harmonic frequency of a fundamental frequency of the AC electrical power distribution network.

3. The voltage regulation device of claim 1, wherein the reactive power set point comprises an amount of reactive power to be provided by the converter to the shunt winding.

4. The voltage regulation device of claim 1, wherein the control system is configured to receive the reactive power set point from an operator.

5. The voltage regulation device of claim 1, wherein the compensation signal is configured to control the amount of reactive power at the output node by injecting reactive power at the shunt winding or removing reactive power at the shunt winding such that the reactive power at the output node remains within a range of values without changing an amount of reactive power from the electrical power source.

6. The voltage regulation device of claim 1, wherein the converter comprises an auxiliary winding, and the converter is configured to magnetically couple to the shunt winding with the auxiliary winding.

7. The voltage regulation device of claim 6, wherein the voltage regulation device further comprises a magnetic core, and wherein the primary winding, the shunt winding, and the auxiliary winding are wound about the magnetic core.

8. The voltage regulation device of claim 7, wherein the primary winding comprises one or more electrically conductive taps, and the voltage regulation device further comprises:
  an inverter electrically connected to the converter; and
  one or more moveable electrical contacts, each of the one or more moveable electrical contacts configured to connect to and disconnect from any one of the electrically conductive taps.

9. The voltage regulation device of claim 8, wherein the converter further comprises a second auxiliary coil electrically connected to the inverter, and the second auxiliary coil is configured to magnetically couple to the moveable electrical contacts.

10. The voltage regulation device of claim 9, wherein the control system is configured to control the inverter to thereby control an amount of current in one or more of the movable electrical contacts during a switching operation.

11. The voltage regulation device of claim 8, wherein the converter further comprises an energy source electrically connected to the inverter.

12. The voltage regulation device of claim 1, wherein the converter is configured to apply pulse-width modulation to the harmonic compensation signal and the reactive power compensation signal to produce the output compensation signal.

13. The voltage regulation device of claim 1, wherein the converter comprises a rectifier.

14. The voltage regulation device of claim 1, wherein the voltage regulation device is a step voltage regulator.

15. A control system for a voltage regulation device, the control system comprising:
  one or more electronic processors; and
  an electronic storage coupled to the one or more electronic processors, the electronic storage comprising machine-executable instructions that, when executed, cause the one or more electronic processors to:
    determine a harmonic compensation signal based on frequency data, the frequency data comprising one or more harmonic components;
    determine a reactive power compensation signal based on a reactive power set point; and
    control a converter of the voltage regulation device based on the determined harmonic compensation signal and the determined reactive power compensation signal to provide an output compensation current to a winding of the converter, wherein the winding of the converter is configured to magnetically couple to a winding of the voltage regulation device, and the output compensation current is configured to control an amount of reactive power provided by the converter to the winding of the voltage regulation device and to reduce an effect of the one or more harmonic components.

16. The control system of claim 15, wherein the amount of reactive power is controlled to be equal to the reactive power set point.

17. The control system of claim 16, wherein the output compensation current includes one or more components, each of which are 180° out-of-phase with the one or more harmonic components.

18. The control system of claim 15, wherein the winding of the converter is configured to magnetically couple to a shunt winding of the voltage regulation device, and the voltage regulation device is a step voltage regulator.

19. The control system of claim 15, wherein the output compensation current is configured to control the amount of reactive power provided by the converter to the voltage regulation device and to reduce the effect of the one or more harmonic components in electrical power received at an input node of the voltage regulation device.

20. A method of controlling a voltage regulation device that comprises a converter, the method comprising:
  determining a reactive power set point, the reactive power set point being a target amount of reactive power provided by an electrical source electrically connected to the voltage regulation device at an input node;
  determining harmonic frequency data at a load electrically connected to the voltage regulation device at an output node, the harmonic frequency data comprising one or more harmonic components;
  determining a converter control signal based on the reactive power set point and the harmonic frequency data;
  magnetically coupling a winding of the converter to a winding of the voltage regulation device; and
  providing the converter control signal to the converter such that the converter produces a compensation current at the winding of the converter, wherein the compensation current reduces an effect of the harmonic components and provides reactive power to the output node, and the amount of provided reactive power is based on the reactive power set point.

21. The method of claim 20, wherein the amount of provided reactive power is equal to the reactive power set point.

22. The method of claim 20, wherein the reactive power set point is determined based on user input.

23. The method of claim 20, wherein the reactive power set point is determined based on an amount of reactive power at the input node.

* * * * *